(12) United States Patent
Lecoester

(10) Patent No.: US 7,368,077 B2
(45) Date of Patent: May 6, 2008

(54) INDUCTION QUENCHING INSTALLATION, IN PARTICULAR FOR FABRICATING SUSPENSION COMPONENTS

(75) Inventor: Francois Lecoester, Douai (FR)

(73) Assignee: Allevard Rejna Autosuspensions, Saint Cloud (FR)

( * ) Notice: Subject to any disclaimer, the term of this patent is extended or adjusted under 35 U.S.C. 154(b) by 399 days.

(21) Appl. No.: 10/677,185

(22) Filed: Oct. 2, 2003

(65) Prior Publication Data

US 2004/0226632 A1   Nov. 18, 2004

(51) Int. Cl.
*C21D 1/10* (2006.01)

(52) U.S. Cl. ...................................... 266/129; 219/640

(58) Field of Classification Search ................ 266/129; 219/640

See application file for complete search history.

(56) References Cited

U.S. PATENT DOCUMENTS

| 4,675,488 | A | * | 6/1987 | Mucha et al. ................ 219/640 |
| 6,160,247 | A | * | 12/2000 | Storm et al. ................. 219/639 |
| 6,290,898 | B1 | * | 9/2001 | Lee ............................. 266/104 |

* cited by examiner

*Primary Examiner*—Scott Kastler
(74) *Attorney, Agent, or Firm*—James Ray & Assoc.

(57) ABSTRACT

A thermal quenching installation making use of induction heating. This installation has induction heater means comprising a stationary induction coil, handling means to cause the element to pass through said coil, and cooling means, preferably a shower, disposed downstream from the coil.

9 Claims, 3 Drawing Sheets

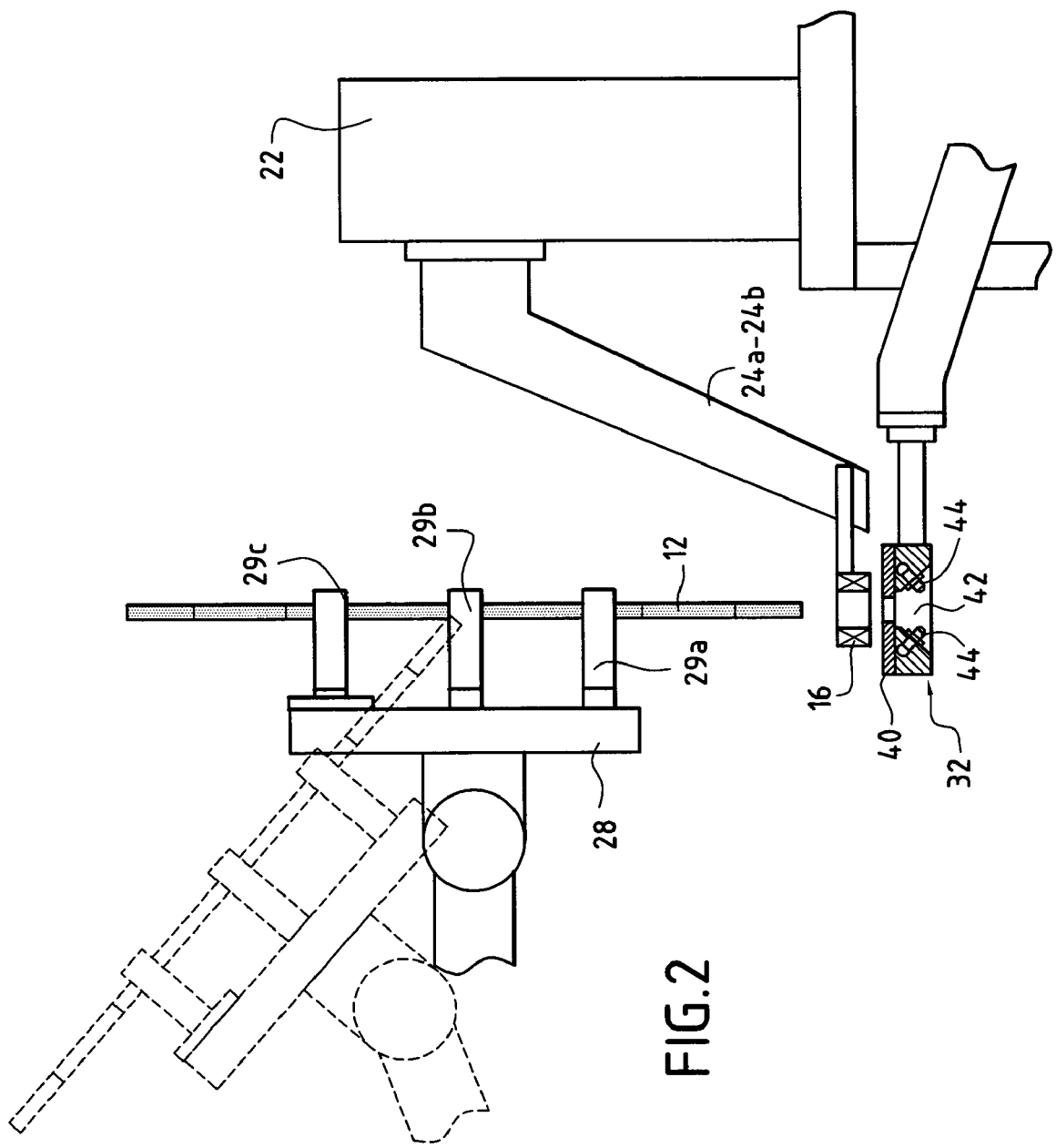

INDUCTION QUENCHING INSTALLATION, IN PARTICULAR FOR FABRICATING SUSPENSION COMPONENTS

The invention relates to a thermal quenching installation for treating an elongate metal element, such as in particular a suspension component for a motor vehicle, e.g. an anti-roll bar, an active half-bar, etc.

The invention applies most particularly to heat treatment for an element that needs to present good resistance to fatigue, i.e. in use, it must be capable of withstanding repeated forces in particular in twisting and/or bending. The invention relates more particularly to a novel installation for performing thermal quenching by induction heating. The invention also provides a method of fabricating a metal element, the method including such a thermal quenching step.

BACKGROUND OF THE INVENTION

In the automotive industry, certain components of the suspension system need to be capable of withstanding repeated stresses during their lifetime. When designing such a component, various treatments are specified for increasing its ability to withstand fatigue. In order to evaluate the effectiveness of such treatments and consequently in order to evaluate the lifetime of the component, standardized stressing cycles are defined which consist in applying a succession of deformations to said components until it breaks. At present, it is desired to be able to guarantee that no breakage can appear under 100,000 cycles. The calculations performed in developing such components show that certain portions of the components are more likely to break than others, and in particular the bends. It is thus mainly these portions which need to be treated in order to guarantee the ability to withstand at least 100,000 cycles. For example, the ability to withstand fatigue of an anti-roll bar is evaluated by subjecting the two ends of the bar to opposing displacement cycles and counting the number of cycles up to breakage. Analogous tests can be defined for evaluating the ability to withstand fatigue of an active half-bar or of any other element of comparable shape. The problem of determining ability to withstand fatigue with such elements is becoming ever more critical, mainly because of two trends:

vehicles are becoming heavier because of the increasing amount of on-board electronic equipment and increasing engine size; and manufacturers are tending to define stabilizing bars of longitudinal axis that is offset very little from axes passing through the centers of the wheels; under such conditions, stabilizing bars are shorter and for a given wheel travel, the amplitude of the displacements of the ends of the bar increases as do the stress levels to which the bar is subjected.

In addition, for 4-wheel drive vehicles, the amount of deflection at the ends of the stabilizing bar is even greater because of the desire to enable the vehicle to negotiate obstacles.

Also, weight reduction due to the use of a tubular bar leads (compared to a solid bar and for identical amplitude of movement) to an increase of strain.

One of the treatments for increasing the resistance to fatigue of a stabilizing bar or an analogous component consists in applying thermal quenching thereto. Depending on the methods used, such quenching is performed either after or before the bar has been shaped, i.e. after or before bending operations. Several techniques are known.

A first method consists in applying austenizing treatment to the bar in an oven, then in bending it while hot and while taking care to ensure that the temperature of the bar remains high enough for the steel to remain in the austenitic range. The bar is then quenched as a whole by being immersed in a liquid. It is accepted that this method of hot-bending followed by overall quenching does not enable highly-stressed bars to be produced. It is applicable only to making solid stabilizer bars.

Another method consists in cold-bending a solid bar, in heating it by conduction by placing its two ends between the electrodes of conduction heater equipment, and then in quenching. Quenching the bar leads to a martensitic transformation to the core of the bar, providing the steel was caused to be completely austenitic during the conduction heating stage. That method is slow and expensive.

Several attempts have been made to perform cold-bending followed by quenching that consist in causing an inductor and a shower to move along the component. Such a method has been found to be extremely slow and difficult to perform because of the electrical losses that occur in the flexible connection powering the moving inductor.

Hollow anti-roll bars are also known, i.e. bars made from a tube, and preferably of varying wall thickness so as to have greater thickness in the bends or other regions that are subjected to high levels of stress. The bar is bent while cold and is subsequently subjected to austenizing treatment in an oven having a controlled atmosphere, followed by quenching. The tubular bar is subsequently subjected to annealing treatment for one hour at 200° C. and it is then shot-blasted internally, the shot being injected by means of a nozzle. In that method, the bar is quenched throughout, thereby making it more difficult to forge its ends since forging then needs to be performed hot.

OBJECTS AND SUMMARY OF THE INVENTION

The invention provides a thermal quenching installation suitable for being implemented on any type of elongate metal element, and in particular an element in the form of a bar that is solid or hollow.

More particularly, the invention provides an installation for thermal quenching an elongate metal element, for example a motor vehicle suspension element, the installation comprising:

induction heater means including a stationary induction coil;

handling means comprising a first multi-axis robot carrying said metal element and arranged to cause said element to pass through said induction coil following a predetermined path; and cooling means arranged downstream said emulsion coil in the travel direction of said element.

In a preferred embodiment, the handling means are arranged to move the element so that a neutral fiber thereof passes through the coil substantially in its center, or as close as possible to said center, given its shape.

The shape of the coil may be adapted to the shape of the treated element, in particular the shape of its section, so that each point of the outline of the element (and more particularly of the portion thereof that is engaged at any given moment in the coil) is at substantially the same distance from the turns of the coil so as to guarantee relatively uniform heating of the element. In the usual case where the element is circular in section, it suffices to control the displacement of the element in such a manner that the center of its portion engaged in the coil always substantially coincides with the center of the coil, with the coil being in the form of a ring of circular outline.

The first robot is programmed to engage the element inside the stationary coil and to make it travel therethrough. For this purpose, the robot arm carries a support fitted with retractable clamps that are spaced apart from one another, thus enabling the element to be held as it goes through the coil. The cooling means may be constituted merely by a vessel containing cooling liquid located close to the zone in which the handling means are active, e.g. close to the induction coil.

In a preferred embodiment, the cooling means may comprise a shower of annular structure dimensioned to allow the element to pass therethrough, and located immediately downstream from the induction coil. This makes it possible to obtain quenching quite quickly. Under such circumstances, the induction coil is preferably substantially horizontal. In this way, the shower can be placed beneath the coil and in the immediate vicinity thereof, with the jets of cooling fluid being directed towards the element and downwards so as to minimize the risk of drops of liquid splashing into the heating zone defined by the coil.

As explained below, it is particularly advantageous for the cooling to take place quite quickly after localized induction heating. It is therefore advantageous for the shower to be placed close to the coil. It may be carried by a second multi-axis robot operating synchronously with the first robot, thus enabling its position and its orientation to be varied as a function of the shape of the element to be treated, while holding it as close as possible to the induction coil, but without interfering therewith.

The invention also provides a method of fabricating an elongate metal element, the method including a thermal quenching step consisting in causing said element to pass through a stationary induction coil forming part of induction heater means, and in cooling the element downstream from said induction coil.

If the element is made from a solid metal bar that has been bent, it is advantageous to implement surface quenching so as to obtain an outer zone of martensitic structure and a core zone of ferrito-pearlitic structure. These two zones are separated by a transition zone of relatively small and well-controlled thickness. It is found that the effect of surface quenching a solid bar is to create compression stresses therein, thereby considerably increasing the ability of the treated zone to withstand fatigue.

When the suspension component is made out of a tubular metal bar, quenching is performed to a depth suitable for ensuring that a martensitic structure is created throughout the thickness of the wall of the tubular bar. The consequence of the treatment is to improve the crystalline structure of the metal so as to obtain good ability to withstand fatigue. Thereafter the inside of the tubular bar can be subjected to shot-blasting, thereby introducing compression stresses inside the structure of the hollow bar in a different manner, said means being known per se for improving the ability of the treated portion to withstand fatigue. It is preferable to perform shot-blasting of the inside freely by injecting shot directly into one end.

BRIEF DESCRIPTION OF THE DRAWINGS

The invention appears more clearly in the light of the following description of an installation for thermal quenching in accordance with the principle of the invention, described purely by way of example and with reference to the accompanying drawings, in which:

FIG. 2 is a diagrammatic elevation view, partially in section, showing the method being implemented;

FIG. 3 is a diagrammatic view seen along arrow III of FIG. 2;

MORE DETAILED DESCRIPTION

Figure 1:
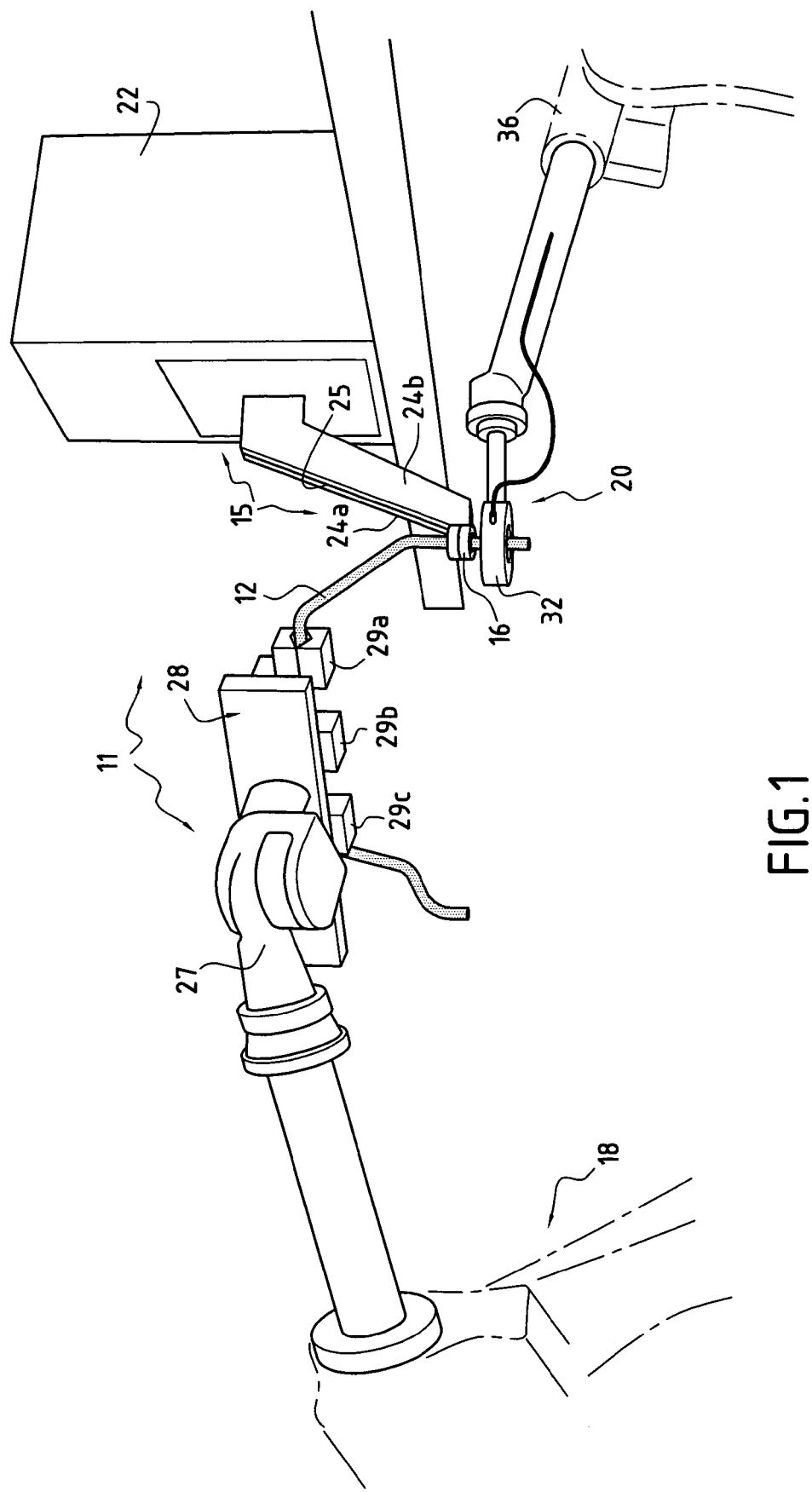
FIG. 1 is a diagrammatic and fragmentary view of a thermal quenching installation more particularly adapted to treating an anti-roll bar of a motor vehicle.
Figure 4:
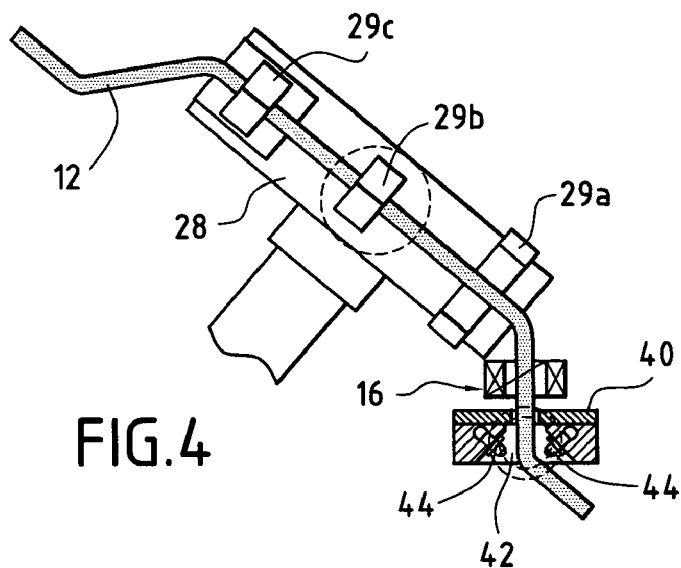
FIGS. 4 to 6 are views similar to FIG. 3 showing different steps in the thermal quenching process.
Figure 5:
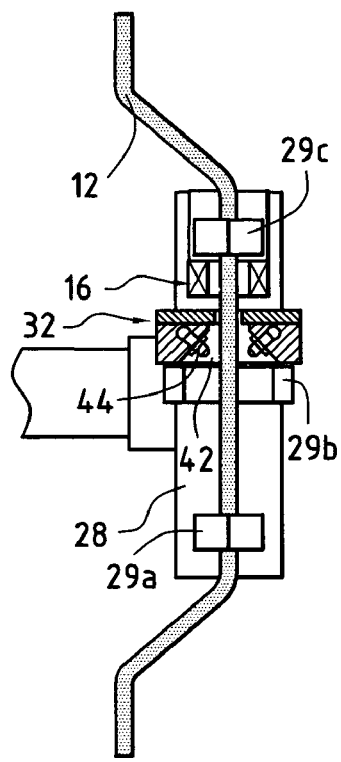

The installation 11 as shown is more particularly designed for applying heat treatment by localized induction heating of an elongate metal element 12 which, in the example shown, is an anti-roll bar of a motor vehicle suspension system. At this stage of fabrication, this element is in the form of a solid cylindrical bar of steel which has been preformed cold using a conventional technique. As described below, the same installation can be used for applying heat treatment to a hollow bar or to an active half-bar, etc. . . . . The element for treatment is fabricated in this case from a cylindrical bar of lightly-alloyed steel. After being shaped cold, this element is subjected to surface quenching implemented by the installation shown. At the end of this surface quenching, the portions of the element that have been surface quenched are constituted by a surface zone of martensitic structure and a core zone that is ferrito-pearlitic, these two zones being united via a transition zone in which both ferrito-pearlitic and martensitic structures coexist. It is known that the martensitic structure is a crystalline structure that is very hard and presents very good resistance to fatigue, i.e. to twisting or bending forces. It is therefore advantageous in itself to create a martensitic structure, at least in those portions of the part that are most highly stressed. However, in the present example, where quenching is performed on the surface, the treated zone having martensitic structure is in compression because the core zone (ferrito-pearlitic) has not expanded. The compression stresses that are thus created in the martensitic zone have the effect of further increasing the ability of the treated element to withstand fatigue.

In order to implement this type of thermal quenching, the invention uses induction heater means 15 including a stationary induction coil 16. The fact that the coil is stationary presents numerous advantages, as explained below. The installation also has handling means 18 arranged to cause the element 12 to pass through the induction coil 16 along a predetermined path. Finally, cooling means 20 are arranged downstream from the induction coil relative to the travel direction of the element. In the example shown, the heater means 15 comprise a coil having a few large-section turns and that is directly connected to a converter unit 22 comprising in particular a capacitive system and a high frequency (HF) generator operating at a frequency that is selected to set up resonance conditions in the oscillating circuit constituted by the coil and the capacitive system. The coil 16 is connected to the converter unit via two wide metal bars 24a, 26b of large section that are flat and side by side, being separated by insulation 25 so that power losses between the coil and the converter unit are minimized. An appropriate choice of frequency enables a desired penetration depth to be obtained as a function of the part to be treated. With such a heater system, the time needed to raise the temperature of the segment of the bar that is placed inside the coil 16 at any given instant is relatively short and compatible with the time needed for performing cold-bending, such that it is possible to envisage implementing an automatic process that operates continuously.

The handling means 18 are arranged to move the pre-bent element 12 so that a neutral fiber thereof passes through the coil 16, substantially in its center. In the example, these handling means comprise a first multi-axis robot 27. The end of the arm of this robot is fitted with a support 28 carrying retractable clamps 29a, 28b, 29c that are spaced apart from one another on said support for the purpose of holding the element 12 as it passes through the coil. The bar is held continuously by at least two closed clamps, said clamps opening and closing as the element 12 advances through the coil so as to ensure that no part of the robot or of the support comes into contact therewith. In the example, the support carries three clamps, one of which is mounted to slide freely, specifically the clamp 29c which is furthest away from the coil when the element for treatment begins to be engaged therein.

Figure 6:
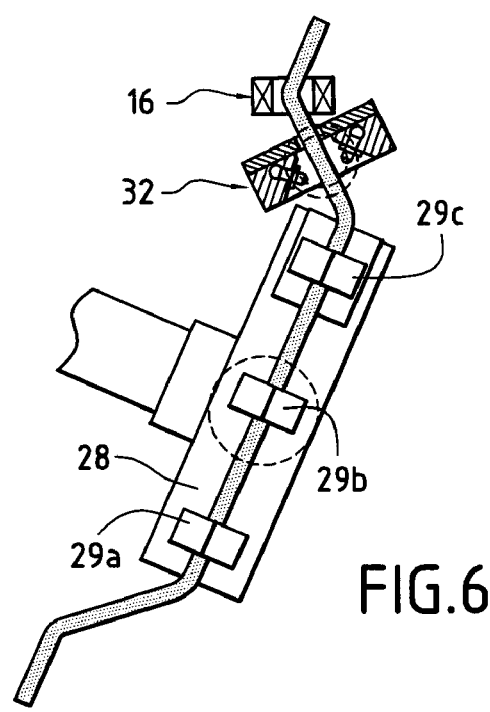

As shown, the induction coil 16 is substantially horizontal, the robot 27 engaging the element 12 through the top face of the coil. Thus, the cooling means 20 can be arranged immediately below the coil, thereby enabling cooling to be obtained that is very sudden and fast as the element 12 leaves the coil. That is why the cooling means are advantageously constituted in this example by a shower 32 of annular structure dimensioned to be capable of having the element 12 pass therethrough. This shower is positioned downstream from the induction coil 16 (in the element travel direction) and in the immediate vicinity thereof. Since the element has a plurality of bends, it is advantageous to be able to vary the position and the orientation of the shower 32 relative to the coil (see FIG. 6, for example) so as to enable the shower to be kept as close as possible to the coil. That is why it is carried by a second multi-axis robot 36 which co-operates synchronously with the first robot 27. In addition, the shower has an inlet face 40 having a central passage through which the element 12 is engaged on leaving the coil. This passage is extended downwards by a shower cavity 42 that is generally frustoconical in shape and in which nozzles 44 are installed for spraying cooling fluid, typically water. These nozzles are directed substantially towards the axis of the central passage, but downstream therefrom. By coordinating the movements of the two robots, by appropriate programming that comes within the competence of the person skilled in the art, it is possible to cause the element 12 to be cooled progressively as it passes through the coil so as to obtain the martensitic transformation. The inlet face 40 of the shower forms a kind of screen making it possible to avoid water splashing towards the coil within which the metal is heated to white heat. This type of cooling serves to minimize and control the thickness of the transition zone in the structure of the element. It has been found that the desired residual compression stresses in the surface are of increasing magnitude with decreasing thickness of the transition zone. By implementing a stationary induction coil, the invention makes it possible to optimize results since the thickness of the transition zone depends on how quickly the steel is cooled once it has been made austenitic. By using a stationary induction coil for heating purposes it is possible to obtain a temperature rise that is very fast followed by cooling at a corresponding rate immediately on leaving the coil. Because of its low losses, induction heating can be much faster than it would be if the inductor were to be moved along the element. In addition, in particular by means of the robot 27, it is easy to vary the speed at which the element 12 travels through the induction coil so as to treat only those zones that need to be quenched, and in particular the bends. The depth of quenching may also be adapted by varying the speed with which the element passes through the coil and/or the frequency of the alternating current with which the coil is fed.

The implementation of the installation is described more clearly with reference to FIGS. 3 to 6. At the beginning of treatment, the element to be treated 12 is held in its central portion by the three clamps 29a-29c. The robot 27 is programmed to engage the end portion of the segment in the top opening of the coil. The end proper is not treated (it can be passed through quickly) so as to ensure that the end of the treated element is suitable for being forged subsequently. The purpose of such forging is to make a fixing tab at the end of the element. Thereafter, the robot 27 takes up a position and moves so that the element engages progressively in the coil 16, while ensuring that the segment that is engaged within said coil is always situated at its center, insofar as that is possible. For example, with reference to FIG. 4, it can be seen that the position and the orientation of the robot has changed in order to pass the first bend of the element. At this moment, it becomes necessary to open the first clamp in order to continue with the treatment, i.e. in order to continue to engage the element in the induction coil. When the portion of the element 12 that was being held by the first clamp has come out from the other side of the shower, then said clamp is closed again and it is the second clamp 29b which is opened in order to enable treatment to continue. During this portion of the treatment (FIG. 5) the element is thus held between the first and third clamps 29a and 29c, with the third clamp being movable in translation. During this period, the longitudinal expansion of the bar does not run any risk of causing the bar to buckle since the third clamp can move. Treatment is continued by closing the second clamp and opening the third clamp until the clamping point of the third clamp has been passed.

Fixed coil induction quenching as described above is followed by conventional operations of known kind such as forging the ends of the bar while hot, shot-blasting its outside, and operations of phosphizing and painting.

From the above, it can be seen that implementing the invention to apply heat treatment to a solid steel element is characterized mainly by a thermal quenching step that consists in causing the element to pass through a stationary induction coil forming part of induction heater means and in cooling the element downstream from the induction coil, preferably as close as possible thereto. When using a solid metal element, the installation can be adjusted so as to obtain surface quenching that enables an outer zone to be created having martensitic structure and a core zone to be created having ferrito-pearlitic structure, with the coexistence of these two zones in coaxial relationship leading to residual compression stresses appearing that are favorable to improving the ability of the element to withstand fatigue.

Figure 7:
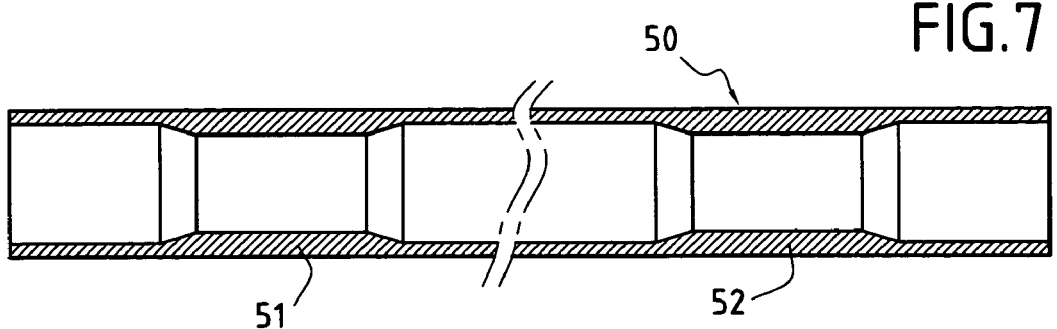
FIG. 7 is a longitudinal section of a tubular bar prior to bending.

The installation described above may also be implemented, with different adjustments, for treating a hollow metal element, i.e. shaped in the form of a tubular bar. For example, FIG. 7 shows a tubular bar 50 of varying thickness prior to being bent, which bar is for shaping and treating in order to constitute an anti-roll bar of a motor vehicle. The thicker portions 51 and 52 correspond to those portions of the bar that are subjected to the highest levels of stress, and in particular the bends. It is advantageous to make such a bar from a tubular segment of constant outside diameter and of varying inside diameter. The thick walls are caused to coincide with the bent portions of the bar which are subjected to the greatest amounts of stress. For example, it is possible to make use of a drawn tube having a wall of varying thickness that is available directly in the "NBK" state. After scale removal, the bar is shaped by being bent while cold, prior to the induction quenching step. If a drawn tube of varying wall thickness is not available, it is possible to start from a tubular metal blank in the "NBK" state and to proceed with scale removal followed by hammering to define zones of varying thickness. The hammering is followed by stabilization at 600° C. for one hour prior to proceeding with cold-bending.

Therefore, induction quenching is performed in the same manner using the same installation. However, quenching is performed over a depth suitable for creating the martensitic structure throughout the thickness of the tubular bar. As before, treatment can be restricted to those portions that will subsequently be subjected to high levels of stress. For example, it can be advantageous not to treat the ends, so that they can be forged subsequently, while cold. Induction quenching is particularly suitable because the outside diameter of the tube is constant, thus making it possible to obtain better control over the size of the airgap between the coil and the treated portion.

Thereafter, the inside of the tube is shot-blasted freely, in other words instead of inserting a nozzle into the inside of the tube as is the common practice, shot is launched directly from one end of the tube, which makes it possible to benefit from the shot bouncing inside the bend in order to obtain effective treatment. The internal shape of the bar encourages a turbulent flow of shot with multiple ricochets. The treatment is performed from both ends of the tubular bar. The effect of such internal shot-blasting is to generate compression stresses comparable to those obtained by the coexistence of a martensitic zone and a ferrito-pearlitic zone within a solid bar. The shot-blasting treatment is followed by internal protection treatment. Thereafter the ends are subjected to cold-forging, to external shot-blasting, and to painting operations.

When the elements subjected to the treatment are not circular in shape, it is possible for the shape of the coil to be adapted to the shape of the section of the element that is to be treated, always for the purpose of maintaining an airgap that is as constant as possible between the element and the coil.

In any embodiment, the method is particularly efficient for selectively treating predetermined parts of the metal bar, particularly by varying the speed at which the element travels through the coil. It is thus possible to treat specifically and even solely those parts of the element subjected to the most important strain, such as bends, particularly main bends in the continuation of torsion axle, or the part of the bar strained uniquely in torsion mode ("back" of the bar) or "forearms" since flexion strains decrease towards ends.

What is claimed is:

1. An installation for thermal quenching an elongate metal element, for example a motor vehicle suspension element, the installation comprising:

induction heater means including a stationary induction coil;

handling means engageable with said element, said handling means at least including a first multi-axis robot carrying said metal element and arranged for causing said element to pass through said induction coil following a predetermined path, said handling means being arranged for varying orientation of said element with respect to said coil when passing therethrough; and cooling means arranged downstream from said induction coil in a travel direction of said element.

2. An installation according to claim 1, wherein said handling means are arranged to move said element so that a neutral fiber thereof passes through said coil substantially in its center.

3. An installation according to claim 1, wherein said handling means include retractable clamps mounted spaced apart from one another on a support in order to hold said element while it is going through said coil.

4. An installation according to claim 3, wherein said support carries three above-specified clamps, one of which is mounted to slide freely.

5. An installation according to claim 1, wherein said induction coil is substantially horizontal.

6. An installation according to claim 1, wherein said cooling means comprise a shower of annular structure dimensioned to be capable of having said elements pass there through, said shower being arranged downstream from said induction coil and in the vicinity thereof.

7. An installation according to claim 6 taken together, wherein said shower is carried by a second multi-axis robot operating synchronously with said first robot.

8. An installation according to claim 6, wherein said shower has a screen-forming inlet face provided with a central passage through which said element is engaged, and wherein said passage is extended by a shower cavity in which nozzles are installed to spray a cooling fluid, said nozzles being directed substantially towards the axis of said central passage, downstream from said central passage.

9. An installation for thermal quenching an elongate metal element, for example a motor vehicle suspension element, the installation comprising:

handling means engageable with said element, said handling means at least including a first multi-axis robot carrying said metal element and arranged for causing said element to pass through said induction coil following a predetermined path, said handling means being arranged for varying orientation of said element with respect to said coil when passing therethrough; and a shower cooling means having an annular structure dimensioned to be capable of having said elements pass therethrough and carried by a second multi-axis robot operating synchronously with said first robot, said shower being arranged downstream from said induction coil and in the vicinity thereof arranged downstream from said induction coil in a travel direction of said element.

* * * * *